US012620715B2

(12) United States Patent
Li et al.

(10) Patent No.: US 12,620,715 B2
(45) Date of Patent: May 5, 2026

(54) DISPLAY SHIELD WITH INTEGRATED ANTENNA

(71) Applicant: Google LLC, Mountain View, CA (US)

(72) Inventors: Pei Li, Mountain View, CA (US); Zheyu Wang, San Jose, CA (US); Sung Hoon Oh, San Jose, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 18/281,651

(22) PCT Filed: Mar. 12, 2021

(86) PCT No.: PCT/US2021/022103
§ 371 (c)(1),
(2) Date: Sep. 12, 2023

(87) PCT Pub. No.: WO2022/191851
PCT Pub. Date: Sep. 15, 2022

(65) Prior Publication Data
US 2024/0154310 A1 May 9, 2024

(51) Int. Cl.
*H01Q 9/04* (2006.01)

(52) U.S. Cl.
CPC ......... *H01Q 9/0421* (2013.01); *H01Q 9/0435* (2013.01); *H01Q 9/0442* (2013.01)

(58) Field of Classification Search
CPC .. H01Q 9/0421; H01Q 9/0435; H01Q 9/0442; H01Q 1/273; H01Q 1/44; H01Q 1/48; H01Q 5/328; H01Q 5/335; H01Q 1/243
See application file for complete search history.

(56) References Cited

U.S. PATENT DOCUMENTS

| | | | | |
|---|---|---|---|---|
| 10,879,606 | B2 | 12/2020 | Ruaro et al. | |
| 10,957,969 | B2 * | 3/2021 | Pandya | H01Q 1/243 |
| 2012/0087065 | A1 | 4/2012 | Kim et al. | |
| 2012/0229347 | A1 | 9/2012 | Jin et al. | |
| 2017/0045916 | A1 * | 2/2017 | Kim | H01Q 1/273 |

(Continued)

FOREIGN PATENT DOCUMENTS

| | | |
|---|---|---|
| CN | 107925152 A | 4/2018 |
| JP | 2015011251 A | 1/2015 |

(Continued)

OTHER PUBLICATIONS

International Preliminary Report on Patentability for International Application No. PCT/US2021/022103 dated Sep. 21, 2023. 12 pages.

(Continued)

*Primary Examiner* — Dameon E Levi
*Assistant Examiner* — Michael M Bouizza
(74) *Attorney, Agent, or Firm* — Lerner David LLP

(57) ABSTRACT

An electronic device is provided having an antenna that also functions as a display shield for a display of the device. The display shield can separate components for a display module from other electrical components of the electronic device. The display shield can be grounded to an enclosure of the device at least partially by one or more shield grounding clips, and configured to receive and/or transmit radio frequency waves.

18 Claims, 7 Drawing Sheets

(56) References Cited

U.S. PATENT DOCUMENTS

| | | | | |
|---|---|---|---|---|
| 2017/0176835 | A1 | 6/2017 | Gupta et al. | |
| 2017/0309995 | A1 | 10/2017 | Kim et al. | |
| 2018/0152220 | A1 | 5/2018 | Mow et al. | |
| 2018/0159575 | A1 | 6/2018 | Erentok et al. | |
| 2018/0166772 | A1 | 6/2018 | Wei et al. | |
| 2019/0081387 | A1 | 3/2019 | Pandya et al. | |
| 2020/0194905 | A1* | 6/2020 | Wei | H01Q 9/0421 |
| 2021/0066781 | A1 | 3/2021 | Oh et al. | |
| 2021/0096515 | A1* | 4/2021 | Ruaro | H01Q 1/273 |

FOREIGN PATENT DOCUMENTS

| | | | |
|---|---|---|---|
| JP | 2019050555 | A | 3/2019 |
| WO | 2018112246 | A1 | 6/2018 |
| WO | 2021042099 | A1 | 3/2021 |

OTHER PUBLICATIONS

First Examination Report for Indian Patent Application No. 202347056754 dated Oct. 30, 2024. 7 pages.

Office Action for Japanese Patent Application No. 2023-555518 dated Feb. 25, 2025. 6 pages.

International Search Report and Written Opinion for International Application No. PCT/US2021/022103 dated Nov. 26, 2021. 17 pages.

Office Action for Chinese Patent Application No. 202180095524.1 dated Mar. 12, 2026. 11 pages.

* cited by examiner

DISPLAY SHIELD WITH INTEGRATED ANTENNA

CROSS-REFERENCE TO RELATED APPLICATION

The present application is a national phase entry under 35 U.S.C. § 371 of International Application No. PCT/US2021/022103 filed Mar. 12, 2021, which is incorporated herein by reference.

BACKGROUND

Electronic devices can include one or more antennas for transmitting and receiving signals in various communication bands. Antenna design for small electronic devices, such as wearable devices, can be challenging because of the constrained form factors of such devices. For example, while a smartphone may have limited space for housing antennas, wearable devices with a compact form factor have even less space. This limited space impacts antenna performance, which may be measured by radiation efficiency and bandwidth. For example, antennas having a bigger size typically have a higher efficiency. Antenna performance for wearable devices may also be severely impacted by body effects due to the close proximity to the wearer, which may cause detuning, attenuation, and/or shadowing of the antenna. In addition, these issues are exacerbated when multiple antennas are implemented in a device and used to support a variety of different common communication standards.

Some electronic devices have display modules that include a display and circuitry for causing information to appear on the display. Some of those electronic devices also have a display shield, which is a physical component that separates (or shields) components of the display module.

BRIEF SUMMARY

The present disclosure provides for integrating an antenna into a display shield for devices having displays. For example, the antenna may be shaped as a display shield and function as a radiating element and as an antenna. The display shield can separate components, such as a printed circuit board or a battery for a device, from other components. An antenna system including the display shield and one or more tuning circuits can be configured for tuning the display shield for multiband frequency transmission, and the display shield can be electrically isolated from the display module and electrically grounded to an enclosure for the device. At the same time, the display shield can be positioned in a device so as to not come in direct contact with the body of a user, for example when the device is a wearable device, such as a smartwatch.

This physical separation between the display shield and the user can mitigate interference from the body of the user, which can potentially arise from interfering body effects and/or the user's body physically blocking incoming and outgoing signals transmitted by the antenna. Examples of body effects can include shadowing, such as blocking the antenna from receiving signals, detuning, such as causing the frequency of the antenna to change, and attenuation, such as reducing the amplitude of incoming and/or outgoing signals.

The present disclosure provides for an antenna, the antenna including: a display shield for a display of a device, the display shield separating display components for a display module from other electrical components of the device, wherein the display shield is grounded at least partially by the one or more shield grounding clips, and wherein the display shield is configured to receive and/or transmit radio frequency waves.

The antenna can be conductively coupled to an antenna feed conductively coupled to a main logic board for the device, and the main logic board can be positioned between the display shield and the enclosure of the device.

The antenna can be a multiband antenna, and the display shield can be electrically coupled to an antenna shorting pin that is coupled to an antenna tuning circuit on the main logic board for the device, and the antenna tuning circuit can be configured to tune the antenna to one of a plurality of frequency bands.

The antenna shorting pin and the antenna feed can be implemented as antenna blades.

The antenna tuning circuit can be one of a plurality of tuning circuits electrically connected to the antenna.

The display shield can completely enclose the other electrical components of the device in the enclosure, and the display shield can be the same size and shape along a first plane as the display.

The display shield can define an aperture extending partially along the surface of the display shield, and the antenna can be grounded by a flexible printed circuit tail passing through the aperture and coupling the display module with at least one other electrical component of the device.

The present disclosure also provides for an electronic device, the electronic device including a display module including a display; and an antenna, wherein the antenna includes: a display shield for the display of the device, the display shield separating display components for the display module from other electrical components of the device, wherein the display shield grounded to an enclosure of the device by one or more shield grounding clips, and wherein the display shield is configured to receive and/or transmit radio frequency waves.

The display shield of the electronic device can be grounded to an enclosure of the device at least partially by one or more grounding clips.

The antenna of the electronic device can be conductively coupled to an antenna feed electrically coupled to a main logic board for the device, and the main logic board can be positioned between the display shield and the enclosure of the device.

The antenna of the electronic device can be a multiband antenna, and the display shield can be conductively coupled to an antenna shorting pin that is coupled to an antenna tuning circuit on the main logic board for the device, wherein the antenna tuning circuit is configured to tune the antenna to one of a plurality of frequency bands.

The antenna shorting pin and the antenna feed of the electronic device can be implemented as antenna blades.

The antenna tuning circuit of the electronic device can be one of a plurality of tuning circuits conductively coupled to the antenna.

The display shield of the electronic device can completely enclose the other electrical components of the device in the enclosure, and the display shield can be the same size and shape as the display along a first plane.

The display module of the electronic device can be enclosed between a cover and the display shield, and the display module can include a display panel laminated to the cover.

The display shield of the electronic device can define an aperture extended partially along the surface of the display shield, and the antenna can be grounded by a flexible printed circuit tail coupling the display module with at least one other electrical component of the device. The components for the display module can include a near-field communication (NFC) module that can be configured for processing radio frequency waves.

The electronic device can be a wearable electronic device intended to be worn by a user, and the display shield can be physically and electrically isolated from the body of the user when worn by the user.

The display of the electronic device can be a liquid crystal display, a light-emitting diode display, an organic light-emitting diode display, a plastic organic light-emitting diode display, or an electronic ink display.

DETAILED DESCRIPTION

Figure 1A:
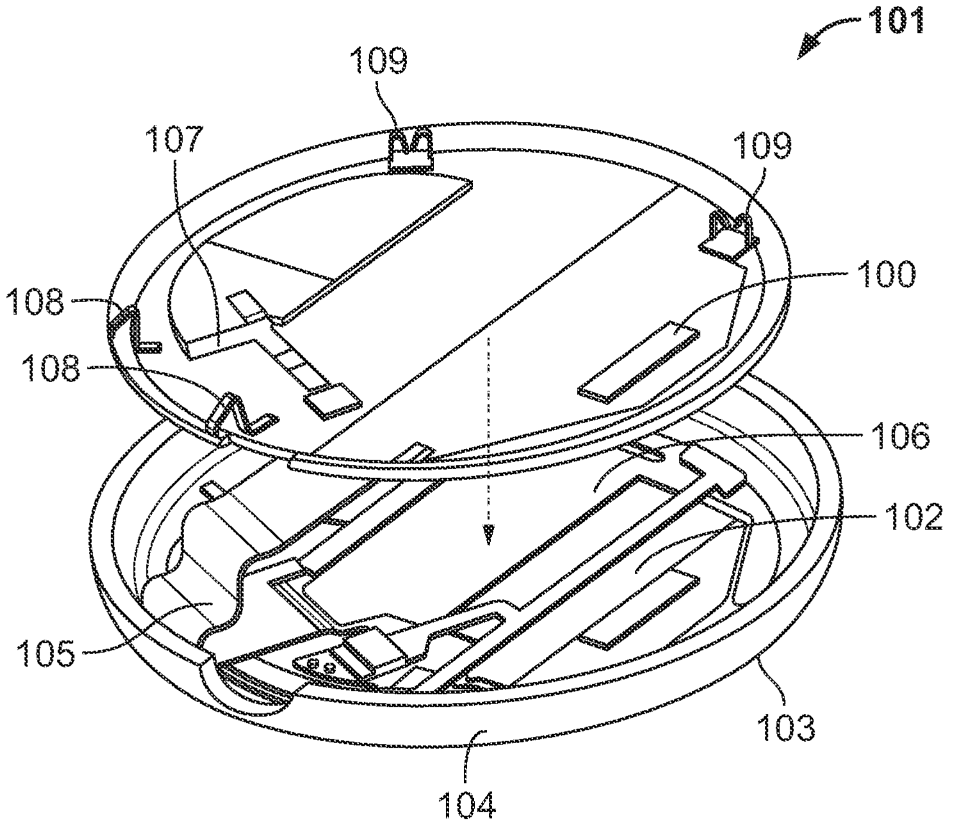
FIG. 1A illustrates an exploded view of an example display module with a display shield, in accordance with aspects of the disclosure.

Overview:

The present disclosure provides examples of display shields for display modules, the display shields co-designed as antennas on electronic devices. For example, the electronic device can be a watch, a smartphone, an electronic reader, or any electronic device with a display. The display shield may function as a multiband antenna and can be configured to receive and/or transmit radio frequency waves. The display shield can be physically isolated from the body of a user when implemented as part of a wearable device.

The display shield can be a planar disc or other shape that can match or approximate the shape and size of a display for a device. The display shield can be configured to support currents or fields that contribute directly to the radiation patterns of the antenna. The display shield can be made from any conductive material, such as from one or more metals or alloys. Other configurations for the display shield are possible and described in detail, herein. The display shield can be grounded by clips attached to the display shield.

The display shield can function as an antenna as part of an antenna system for the device. The antenna system can include an antenna feed and a shorting pin that can provide electrical connection from the display shield to a radio chipset and antenna tuning circuitry. The radio chipset and antenna tuning circuitry can be components of the device and be physically separated by the display shield from a display module. The antenna tuning circuitry can tune the antenna system to receive and/or transmit radio frequency signals along a variety of different frequency bands through the display shield. The antenna tuning circuit and/or radio chipset can be implemented as part of a main logic board for the electronic device.

The display shield can sit partially within a device enclosure that houses different components, such as a battery or a main logic board. In some examples, the display shield can define an aperture for a flexible printed circuit tail or other electrical connector for connecting the different components of the electronic device with components of a display module. In some examples, the flexible printed circuit tail provides additional grounding for the display shield.

The antenna system can include a feed blade or spring clips for electrically connecting the display shield to an antenna tuning circuit. The antenna system can include multiple antenna tuning circuits electrically connected to the display shield through shorting blades, spring clips, or other types of connectors.

Aspects of the disclosure can provide for efficient operation of devices, particularly for small factor wearable electronic devices. The antenna system is arranged in the enclosure of a device to allow for physical distance between the antenna system and the body of a user operating the device, allowing for reduction of body effect and specific absorption rate. At the same time, the antenna system provided can allow for a relatively large antenna size, at least because the display shield acting as an antenna can be shaped and sized to be as large as a corresponding display for the device. The antenna system can be tuned for multiband performance across a variety of frequency bands corresponding to common wireless communication standards, such as cellular, UMTS (Universal Mobile Telecommunications System), Wi-Fi®, Bluetooth®, GPS, and Long-Term Evolution (LTE™) communication.

The display shield can be configured to receive and/or transmit radio frequency signals across a variety of different frequency bands, and can reduce or eliminate the need for additional elements in the physically constrained device to function as all or part of an antenna. Further, instead of implementing multiple antennas on a device already implementing a display shield, the display shield itself can be adaptively tuned to meet communication requirements across multiple frequency bands. Therefore, available physical space within the device can be more efficiently used, at least because the display shield is co-designed for protecting display components of a display module and while functioning as a multiband antenna.

The antenna system with display shield configured as described herein can be implemented across a variety of different devices, such as in smartwatches, tablets, personal computers, smartphones, and generally any device having a display. For wearable devices such as smartwatches, the antenna system can be implemented alongside a variety of different materials for securing the device onto the body of a user when worn. For example, the antenna system can perform robustly with various strap materials, such as metal, rubber, leather, or various kinds of textiles.

Example Systems:

FIGS. 1A-D illustrate an example display module with display shield, which can be part of an electronic device. The device can implement an antenna system that includes the display shield of the display module. The example electronic device can be a wearable device, for example a smartwatch. However, it should be understood that example antenna systems with display shields as described herein can be implemented in any of a variety of electronic devices with a display, including both wearable and non-wearable devices, such as smartphones, tablets, laptops, and televisions.

FIG. 1A illustrates an exploded view of an example display module 101 with a display shield 100 in accordance with aspects of the disclosure. The display module 101 can include display components 102 for implementing any of a variety of different displays. For example, the display module 101 can be a module for a liquid crystal display (LCD), light-emitting diode display (LED), an organic light-emitting diode display (oLED), a plastic organic light-emitting diode display (pOLED), or an electronic ink display. The display components 102 can include any component of the display module 101 sandwiched between the display shield 100 and a cover 103.

Depending on the type of display implemented, the display components 102 can include components for implementing that type of display. For example, the display components 102 can include an emissive layer including light-emitting diodes on a substrate, and other components for passing current through the emissive layer. The display components 102 can be positioned behind the cover 103, which may be glass, plastic, or generally any material that does not completely obscure an emissive layer for a display. In some examples, the emissive layer of the display components 102 can be laminated onto the cover 103, or adhered to the cover 103 using a transparent adhesive material.

In some examples, the display components 102 can implement a display as a display panel including one or more emissive layers sandwiched between transparent panels of material such as glass or plastic. The display panel can include additional materials, such as polarizing films, filters, etc.

The display components 102 can include any of a variety of other components available on electronic devices with displays, such as a capacitive or resistive layer of material for receiving touch input to the display module 101. The display module 101 can be configured for receiving and processing touch input, and emit image, text, or video. In some examples, the display components 102 can include an ambient light sensor (ALS) and be configured for receiving and processing signals received by the ALS. The display module 101 can be configured to, for example, adapt the brightness of the display based on the strength of light measured by the ALS. The display components 102 can be electrically connected to other components of an electronic device through a display flexible printed circuit (FPC) tail 105. In some implementations, the display components 102 are electrically connected to other components of a device by wires, traces, or other conductive material.

The FPC tail 105 can pass electric signals to and from the display module 101 and other components, such as a battery or a main logic board, of an electronic device implementing the display module 101. The display components 102 can also include exposed copper or other conductive material for anchoring one end of the display FPC tail 105 to the display components 102. The FPC tail 105 can be made longer than necessary to connect the display components 102 to other components of the electronic device to allow for a service loop during device assembly. The display shield 100 can define an aperture 107 shaped and sized to allow the FPC tail 105 to pass through the display shield 100.

The display shield 100 can physically separate the display components 102 from other components of an electronic device implementing the display module 101. The display shield 100 can be made of a metal, or a conductive non-metal material, such as graphite. In some examples, the display shield is coated with a conductive material. The display shield 100 can be attached to the display components 102 with an adhesive layer 106 of material. The adhesive layer 106 of material can be, for example, pressure sensitive adhesive (PSA).

The display shield 100 can be substantially the same shape and size along a plane as a display for the display module 101. For example, if the display module 101 has a circular display, the display shield can be of a circular shape and sized to sandwich the display components 102 with the cover 103. The cover 103 can extend at least partially to sides 104 of the display module 101, and the display shield 100 can be of a size and shape appropriate to fit flush with, or partially within, the cover 103. In some implementations, the display shield 100 can be other shapes, such as rectangular, triangular, oblong, etc.

The display shield 100 can include one or more shield grounding clips 108. In some examples, the shield grounding clips 108 can be affixed to a side of the display shield 100 that faces away from the display components 102. In addition, the display shield 100 can include blade clips 109 that are formed to receive antenna blades electrically connecting the display shield 100 to other components of the electronic device, described herein. The blade clips 109 can be curved pieces of conductive material affixed to the display shield 100 and configured to hold a blade in place when inserted between the curved pieces. The blades can form electrical connections between the display shield 100 and other components of an antenna system, such as tuning circuitry and/or a radio chipset, described herein. The number of shield grounding clips 108 and blade clips 109, as well as their position relative to one another, can vary depending on, for example, the position of other components of the electronic device.

Figure 1B:
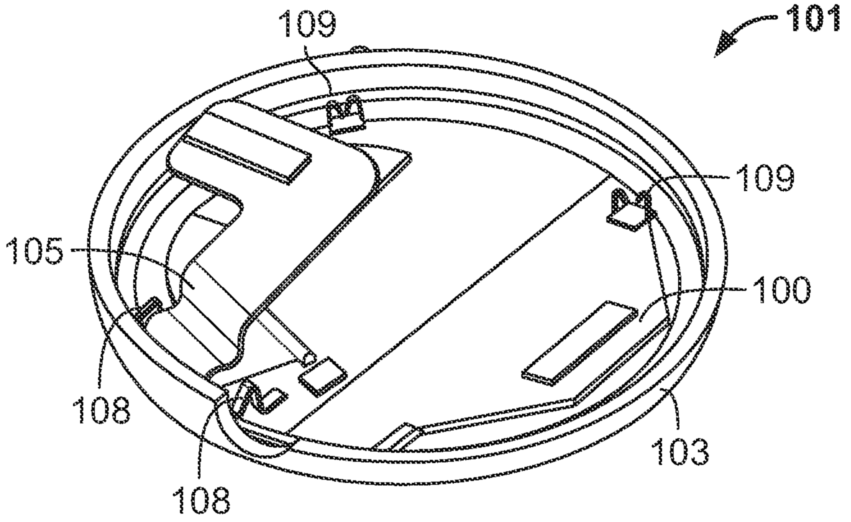
FIG. 1B illustrates a perspective view of the example display module with the display shield and a display flexible printed circuit tail, in accordance with aspects of the disclosure.

FIG. 1B illustrates a perspective view of the example display module 101 with the display shield 100 and the display flexible printed circuit tail 105 in accordance with aspects of the disclosure. FIG. 1B illustrates the display shield 100 positioned partially within the cover 103. In some implementations, the display shield 100 can be flush with the edges of the cover 103, instead of positioned partially within the cover 103. In FIG. 1B, the display components 102 of the display module 101 are hidden, because the display components 102 are sandwiched between the cover 103 and the display shield 100. The display shield 100 may have a smooth surface or can be grooved at one or more locations to allow for extra space for the display components 102 when sandwiched between the cover 103 and the display shield 100. The FPC tail 105 is also shown in FIG. 1B as passing through the display shield 100.

Figure 1C:
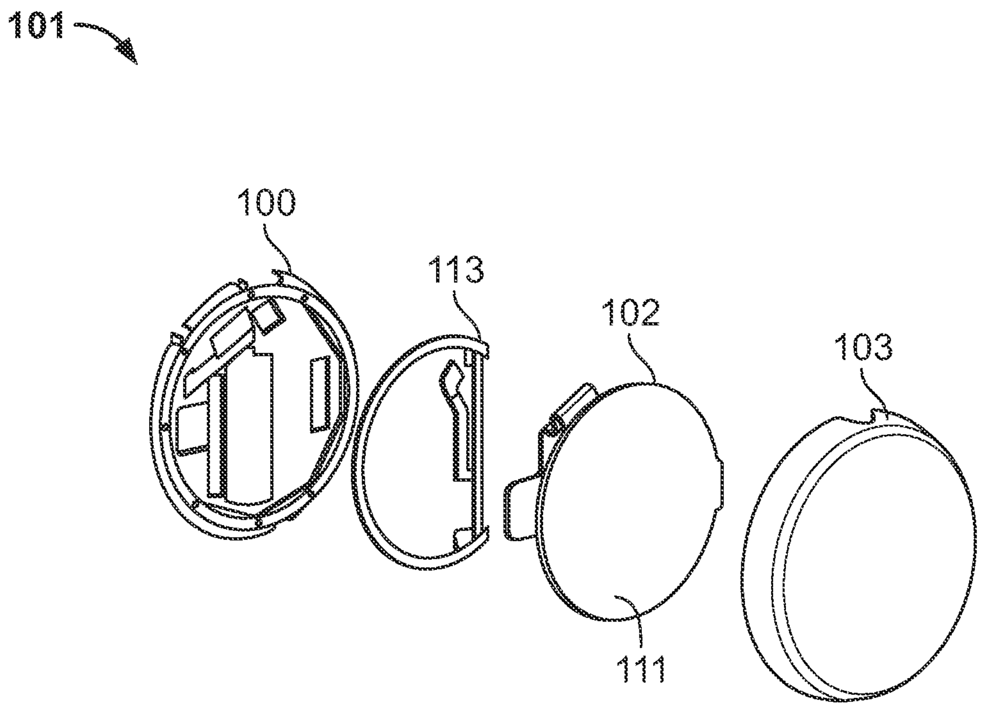
FIG. 1C illustrates an exploded view of the example display module with the display shield, cover, and display components, in accordance with aspects of the disclosure.

FIG. 1C illustrates an exploded view of the example display module 101 with the display shield 100, the cover 103, and the display components 102 in accordance with aspects of the disclosure. The cover 103 can be shaped and sized to completely cover display 111, so as to protect the display 111 from damage while still allowing contents of the display 111 to be seen. The cover 103 also allows touch input to be passed through the cover 103 and the display components 102, in examples in which the display module 101 is configured to receive touch input. In FIG. 1C, the display module 101 is shown as including a near-field communication (NFC) module 113. The NFC module 113 can be configured for receiving and transmitting data to and from other NFC-enabled devices.

The NFC module 113 can be positioned along the display shield 100, which can act as a carrier to improve the performance of the NFC module 113.

Figure 1D:
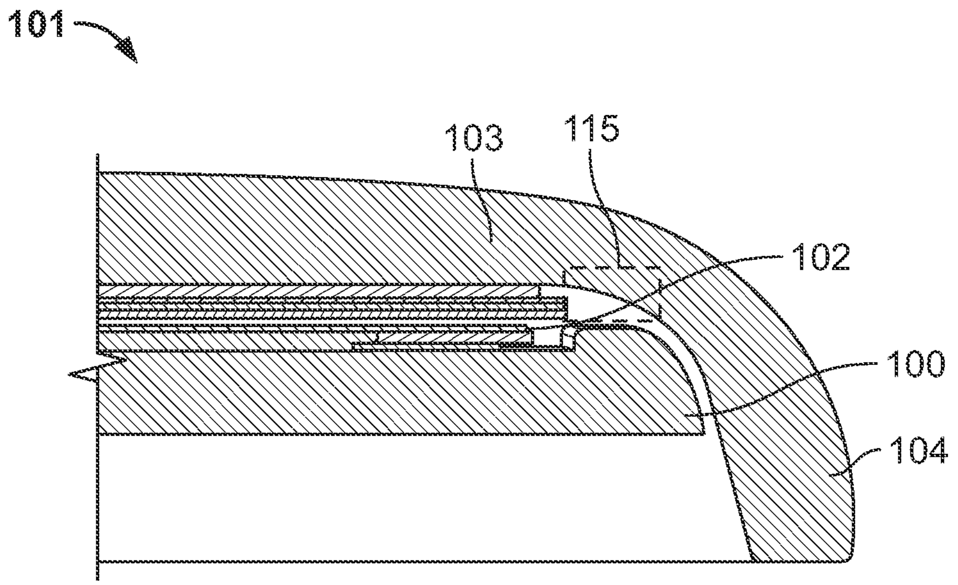
FIG. 1D illustrates a cross-sectional view of the example display module with the display shield, cover, and display components, in accordance with aspects of the disclosure.

FIG. 1D illustrates a cross-sectional view of the example display module 101 with the display shield 100, cover 103, and display components 102 in accordance with aspects of the disclosure. As described with reference to FIGS. 1A-B, the display shield 100 and the cover 103 can sandwich the display components 102. Further, the display shield 100 can be positioned at least partially within the cover 103, with the cover 103 extending at least partially over the sides 104 of the display module 101. FIG. 1D also shows a gap 115 formed between the display shield 100 and the cover 103. The display shield 100 can extend past the display components 102, creating the gap 115 and allowing radio signal to pass through the gap 115 and improving signal quality at least by increasing overall surface area on the display shield 100 and by providing additional space for signals to pass.

Figure 2:
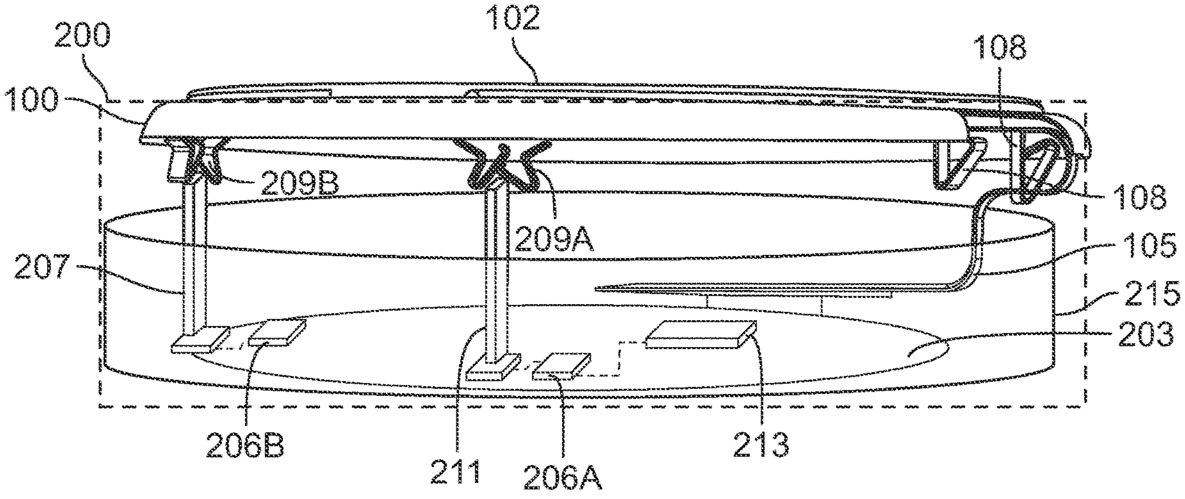
FIG. 2 illustrates an exploded view of an antenna system including the display shield, in accordance with aspects of the disclosure.

FIG. 2 illustrates an exploded view of an antenna system 200 including the display shield 100 in accordance with aspects of the disclosure. The antenna system 200 can be implemented as part of an electronic device having a display, such as a smartwatch. The antenna system 200 can include the display shield 100, a shorting blade 207, antenna tuning circuits 206A-B, a feed blade 211, and radio chipset 213.

The antenna tuning circuits 206A-B and the radio chipset 213 can be positioned on a main logic board 203 for the electronic device. The main logic board 203 can be positioned in an enclosure 215. Other components of the electronic device, such as a battery, can also be positioned within the enclosure 215 and be separated from the display components 102 by the display shield 100. The enclosure 215 may further be adapted to modularly attach to other components. For example as shown, where the device is a smartwatch, the enclosure 215 may be adapted to attach to a watch band. The watch band may be made of any appropriate material, including metal, ceramic, leather, polymers, fabric, etc.

The enclosure 215 itself can be a housing for the electronic device. The enclosure 215 can be made of a conductive material or coated with a material, such as metal or plastic, and the display shield 100 can form a ground connection with the enclosure 215 through the shield grounding clips 108.

The display shield 100 can act as a radiating element configured for receiving and sending out radio frequency signals at different frequencies. The feed blade 211 can electrically connect the display shield 100 to the radio chipset 213. The radio chip set 213 can include one or more circuits configured for receiving incoming radio frequency signals from the display shield 100, and sending outgoing radio frequency signals to the display shield 100 for transmittal. The radio chipset can function as a cellular modem, and be configured to receive and send cellular signals, as well as signals across a variety of different frequency bandwidth, as described herein. The feed blade 211 can be connected to the display shield by coupling with the blade clips 109.

In some implementations, the feed blade 211 can be attached to the display shield 100 in other ways, such as being directly attached to the display shield 100 without the use of the blade clips 109. The radio chipset 213 can be integrated as part of the main logic board 203. In some implementations, the radio chipset 213 is a separate component of the electronic device that can be coupled to the main logic board 203, for example using a wire or conductive trace.

The antenna system 200 can include a tuning circuit 206A electrically connected between the radio chipset 213 and the feed blade 211. The feed blade 211 can be connected to the display shield 100 through the blade clips 109. In general, the tuning circuit 206A can be configured for tuning the resonant frequency of the display shield 100 for operating according to a variety of different frequency bands. For example, the antenna system 200 can be configured to operate in different frequencies commonly associated with the LTE® communication standards, including low-band frequency range between 700 MHz and 960 MHz, mid-band frequency range between 1710 MHz to 2200 MHz, and high-band frequency range between 2500 MHz and 2700 MHz Other frequency bands in which the antenna system 200 can perform include frequency ranges for GNSS frequency bands, which may include GPS frequency centered around 1575.42 MHz, GLONASS frequency between 1596-1607 MHz, and BeiDou frequency centered around 1561.098 MHz. In addition or alternatively, the antenna system 200 can be tuned to operate in frequency ranges between 2400 MHz and 2484 MHz for Wi-Fi and Bluetooth signals. As such, the antenna system 200 may provide coverage of LTE communication bands, GPS communication bands, and coverage of Wi-Fi and Bluetooth communication bands.

The antenna system 200 can include multiple tuning circuits 206A-B, as shown, for further fine-tuning the resonant frequency of the display shield 100 within a frequency band. For example, the tuning circuit 206B can be electrically connected to the shorting blade 207. The shorting blade 207 and the blade clips 109B can be a shorting pin between the tuning circuit 206B and the main logic board 203 to the display shield 100. The tuning circuit 206B can be configured to fine-tune the resonant frequency of the display shield 100 tuned by the tuning circuit 206A. In some implementations, the antenna system 200 can include more or fewer tuning circuits. For example, in some implementations, the antenna system 200 can include a single tuning circuit configured to tune the display shield according to a variety of different frequency bands. The tuning circuits 206A-B can improve frequency match, antenna efficiency, and reduce specific absorption rate.

Also in FIG. 2, the display FPC tail 105 is shown and can further ground the display shield 100, in addition to the grounding clips 108. In some implementations, the display shield 100 can be grounded by only the grounding clips 108, or only the display FPC tail 105.

FIGS. 3A-D are diagrams of various example antenna systems. For each of the FIGS. 3A-D, a main logic board from an example electronic device implementing an example antenna system is shown from a top-down perspective. Recall from FIG. 2, one possible arrangement can be that the main logic board 203 is positioned inside the enclosure 201 and electrically connected to the display shield 100 through the FPC tail 105 and the antenna blades 207, 211. In addition to the components shown with reference to FIGS. 3A-D, main logic boards 301A-D can include other components, not shown. For example, the main logic boards 301A-D can include radio chipsets for receiving and processing radio frequency signals.

Figure 3B:
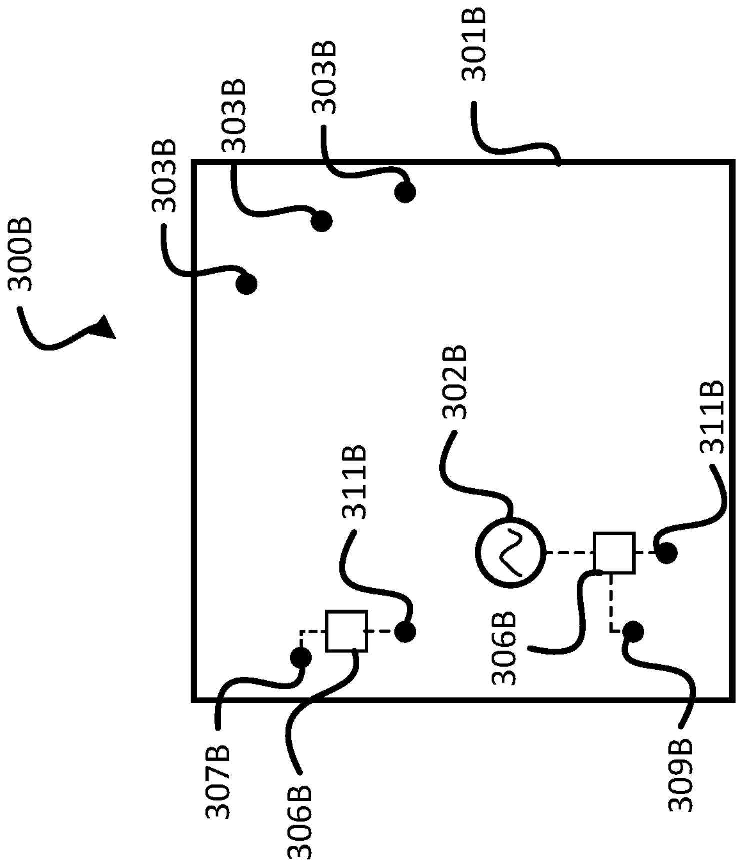
FIG. 3B is a diagram of a second example antenna system, in accordance with aspects of the disclosure.
Figure 3A:
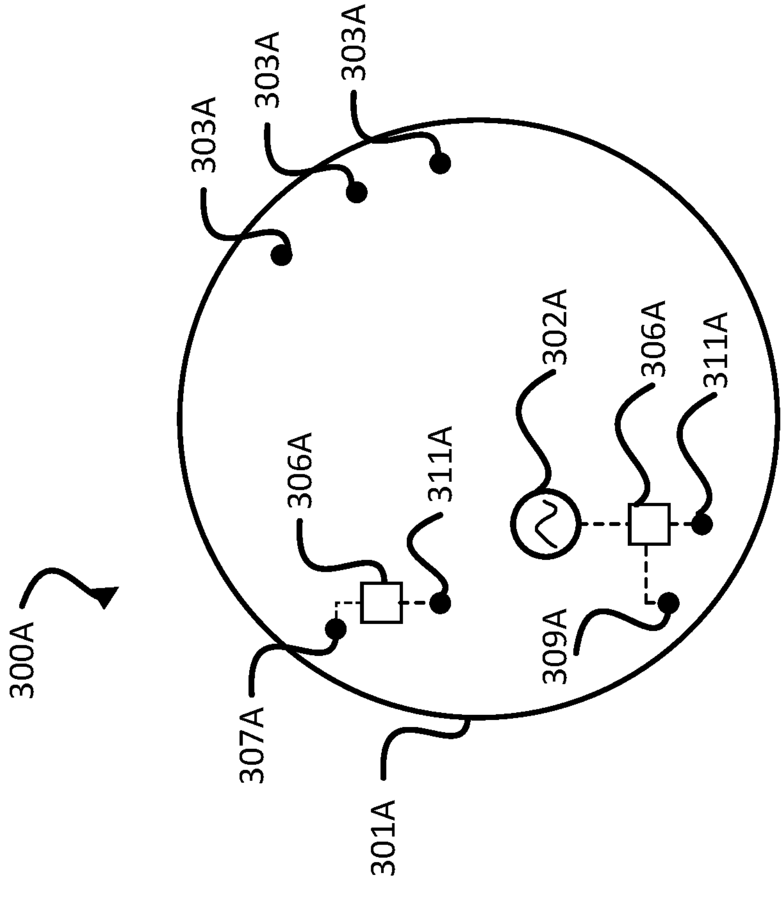
FIG. 3A is a diagram of a first example antenna system, in accordance with aspects of the disclosure.

FIG. 3A is a diagram of a first example antenna system 300A in accordance with aspects of the disclosure. On a main logic board 301A, the first example antenna system can include a power source 302A, multiple grounding points 303A, tuning circuits 306A, shorting pin 307A, and antenna feed 309A. The tuning circuits 306A can also be grounded by grounding points 311A. The multiple grounding points 303A can ground the display shield, and can be positioned as far as physically possible on the main logic board 301A from the antenna feed 309A. In some implementations, the multiple grounding points 311A can also be placed in other positions relative to the antenna feed 309A and/or the tuning circuits 306A and the antenna feed 309A.

FIG. 3B is a diagram of a second example antenna system 300B in accordance with aspects of the disclosure. In FIG. 3B, main logic board 301B is rectangular in shape, which can correspond to the shape of other components of an electronic device, such as its display shield and display (not shown). As described herein, the size and shape of the display shield can vary in accordance with the size and shape of the enclosure. The main logic board 301B can be similarly shaped and sized to allow for larger distances, e.g., such as the distance between corners of the main logic board 301B, between ground points 303B and antenna feed 309B. The main logic board 301B can also include tuning circuits 306B, grounded by grounding points 311B. The main logic board 301B can also include a power source 302B and shorting pin 307B.

Figure 3C:
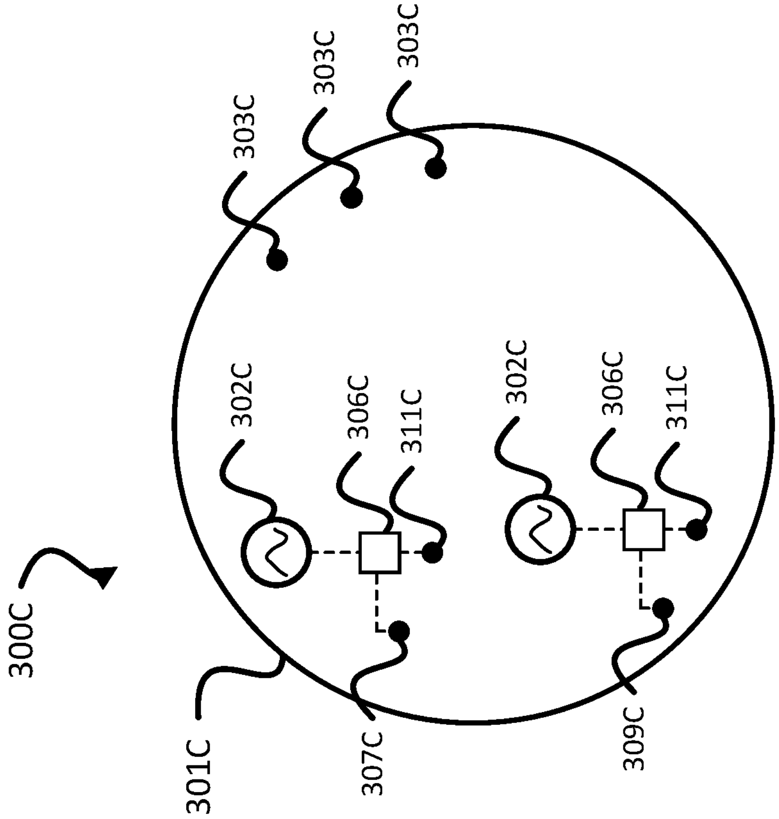
FIG. 3C is a diagram of a third example antenna system, in accordance with aspects of the disclosure.

FIG. 3C is a diagram of a third example antenna system 300C in accordance with aspects of the disclosure. In the third example antenna system 300C, an antenna shorting pin 307C can be configured as a second antenna feed, in addition to antenna feed 309C. Adding a second antenna feed can potentially increase potential bandwidth range for the third example antenna system 300C, as well as improve transmission overall. Main logic board 301C can also include power sources 302C connected to tuning circuits 306C. The tuning circuits 306C can be grounded by grounding points 311C. Similar to the main logic boards 301A-B shown in FIGS. 3A and 3B, the main logic board 301C can also include grounding points 311C for grounding the display shield (not shown).

Multiple feeds can also allow for distribution of the range of frequencies, allowing different feeds to be dedicated to receiving signals at different respective frequencies. Multiple feeds can also provide for rapid switching between feeds in response to different operations performed by the electronic device. For example, the device can be configured to perform operations that require transmission to both Bluetooth and Wi-Fi signals, which can each be assigned to a respective feed. The antenna system 300C can be configured to switch between feeds depending on which type of signal is required to perform a current operation. In some examples, the antenna system 300C with multiple antenna feeds can provide for concurrent execution of operations relying on signals from multiple frequencies.

Figure 3D:
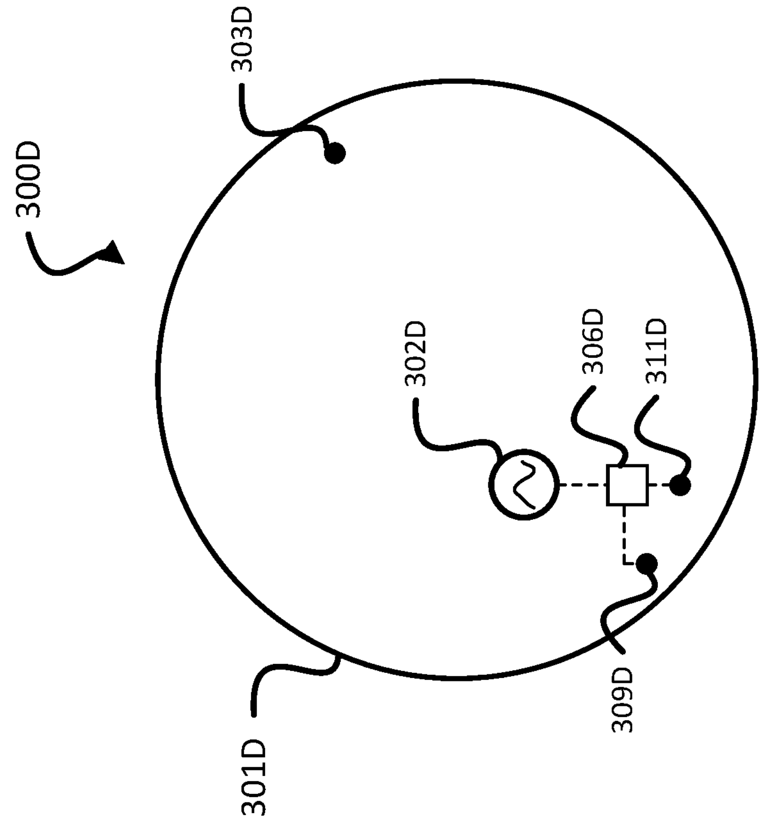
FIG. 3D is a diagram of a fourth example antenna system, in accordance with aspects of the disclosure.

FIG. 3D is a diagram of a fourth example antenna system 300D in accordance with aspects of the disclosure. In the fourth example antenna system 300D, the antenna shorting pin is removed altogether. In addition, the display shield is grounded by a single grounding point 303D on main logic board 301D. The grounding point 303D can be a FPC tail connecting the main logic board 301D to display components of a display module (not shown). The main logic board 301D can also include a power source 302D, antenna feed 309D, and tuning circuit 306D with grounding point 311D.

Although different specific variations are shown between the example antenna systems in FIGS. 3A-D, it is understood that various implementations of the disclosed subject matter provide for example antenna systems with different characteristics. In one example, an example antenna system can have a second antenna feed as well as a single grounding point replaced by the FPC tail. In another example, the display shield and main logic board can be rectangular in shape and include multiple tuning circuits, with a shorting pin configured to function as an antenna feed.

Figure 4:
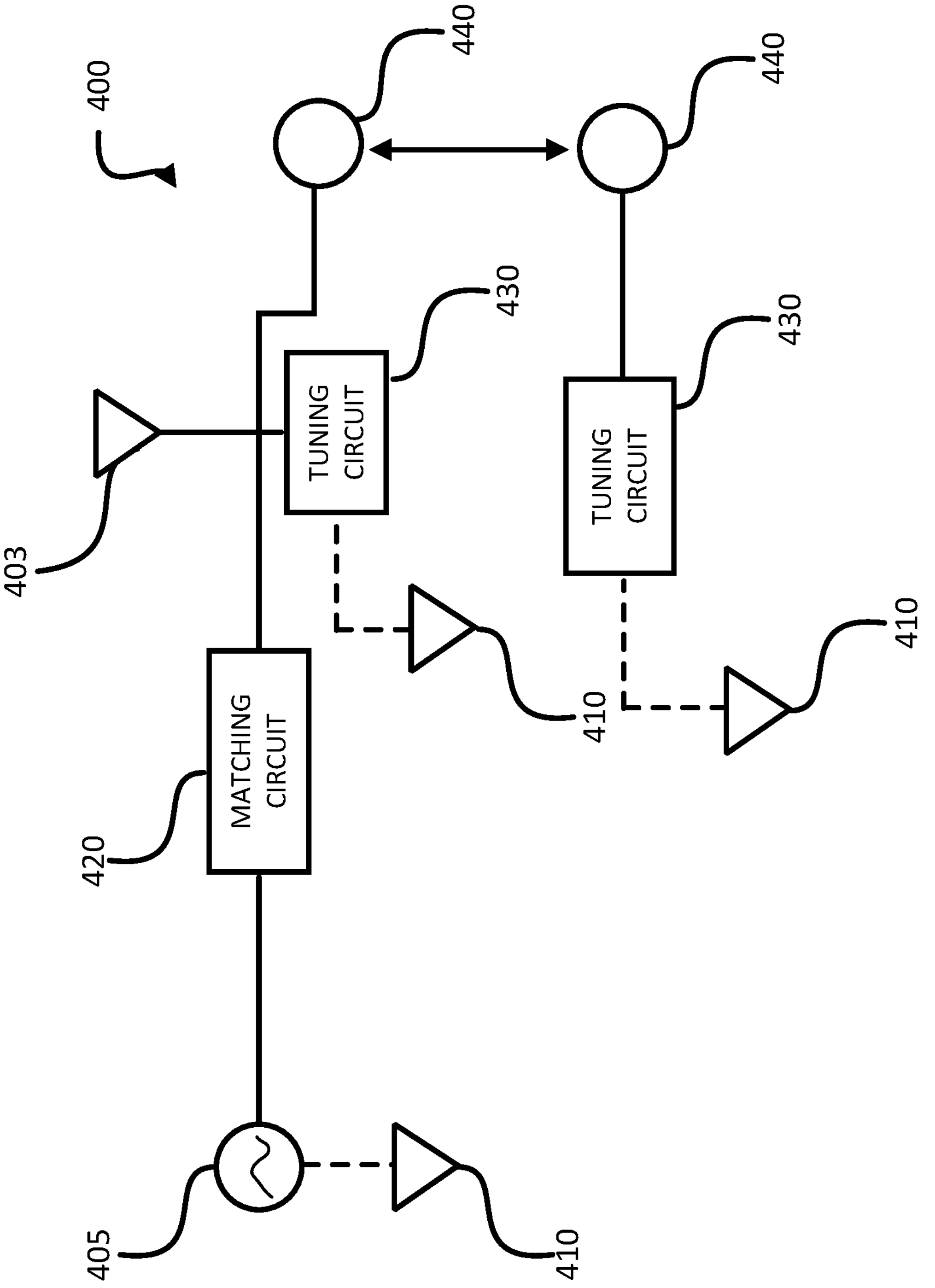
FIG. 4 is a circuit diagram for an example antenna system, in accordance with aspects of the disclosure.

FIG. 4 is a circuit diagram 400 for an example antenna system in accordance with aspects of the disclosure. An antenna feed 403 can couple the display shield to the rest of the circuitry, as shown in FIG. 4. A power source 405 can be a battery or other source of power for the example antenna system, and can be connected to a circuit ground point 410. The circuit diagram 400 also shows a matching circuit 420, as well as tuning circuits 430.

A matching circuit is an impedance transforming circuitry that ensures proper impedance matching by transforming either or both impedances of a radio source and a load. The matching circuit 420 may include components such as inductors and capacitors. For instance, the matching circuit 420 may increase or decrease impedance of the radio source to match an impedance of the first antenna. Alternatively or additionally, the matching circuit 420 may increase or decrease impedance of a display shield to match an impedance of the radio source.

The circuit diagram 400 also shows grounding points 440, which can include shield grounding clips as shown with reference to FIGS. 1A-D, 2. As another example, one or more of the grounding points 440 can be the FPC tail 105, as shown in FIGS. 1A-D. The circuit diagram 400 is one possible arrangement of the various circuit elements provided herein, although it is understood that other configurations are possible, for example configurations corresponding to the example antenna systems shown and described with reference to FIGS. 3A-D.

Figure 5:
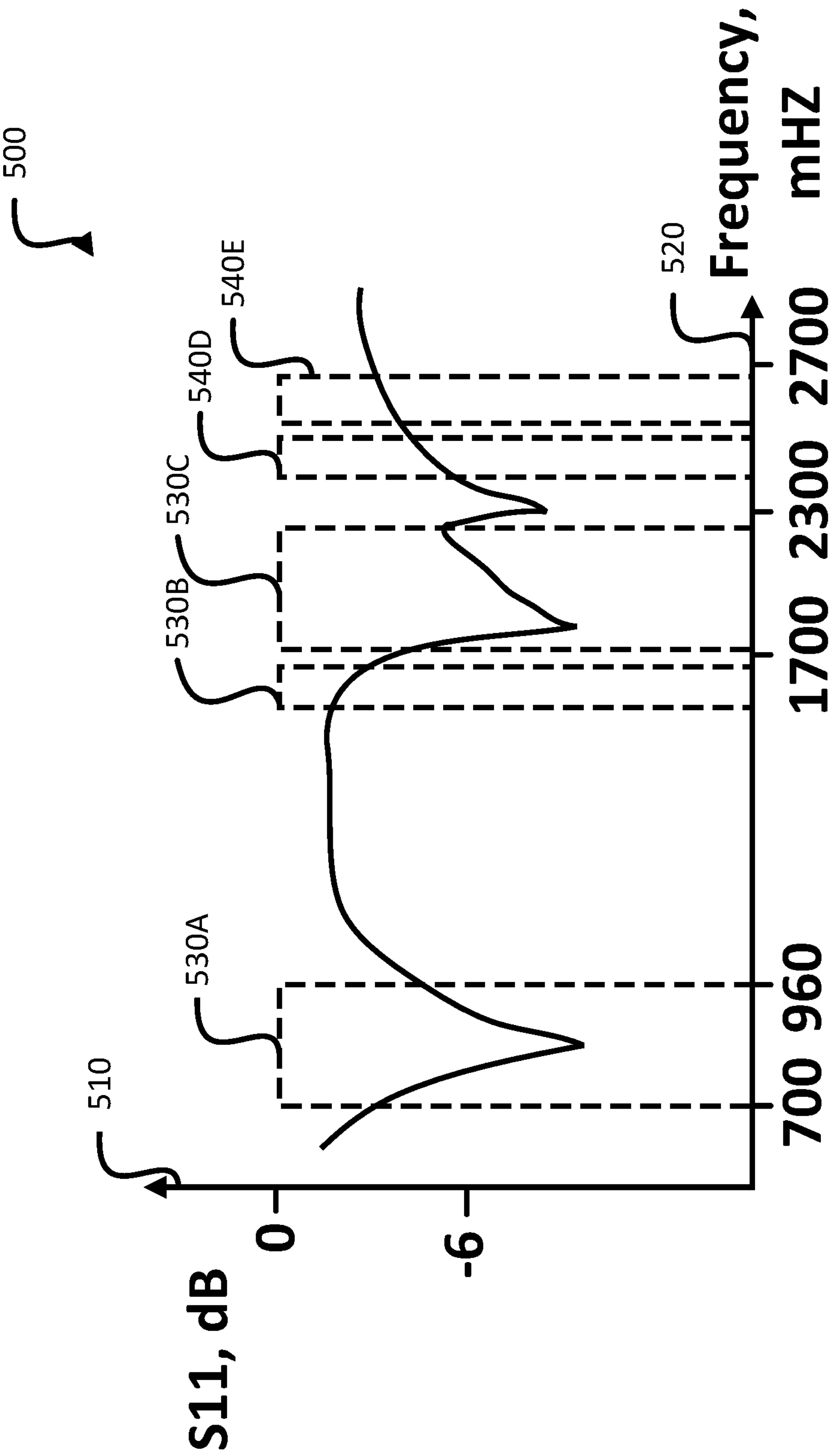
FIG. 5 is a graph quantifying resonance of an example antenna system as the S11 parameter for the antenna system over multiple frequency bands.

FIG. 5 is a graph 500 quantifying resonance of an example antenna system as the S11 parameter for the antenna system over the frequency at multiple frequency bands 530A-E. The y-axis 510 represents the S11 parameter of the antenna system, measured in decibels. The x-axis 520 represents the frequency of the antenna system, measured in megahertz. Frequency band 530A lies between 699 and 960 megahertz, commonly associated with the low-band LTE® standard. Frequency band 530B is centered around 1575.42 megahertz, commonly associated with GPS frequency band. Frequency band 530C lies between 1710 megahertz and 2200 megahertz, commonly associated with the mid-band LTE® standard. Frequency band 530D lies between 2400 megahertz and 2484 megahertz, commonly associated with the Wi-Fi® and Bluetooth® communication standards. Frequency band 530E lies between 2500 megahertz and 2700 megahertz, commonly associated with the high-band LTE® standard.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as “such as,” “including” and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An multiband antenna, comprising:
an antenna tuning circuit;
an enclosure;
a main logic board; and
a display shield configured to receive and/or transmit radio frequency waves and separate display components of a display module from other electrical components,
wherein the display shield is further configured to be grounded to the enclosure at least partially by one or more shield grounding clips,
wherein the display shield is electrically coupled to an antenna shorting pin that is coupled to the antenna tuning circuit on the main logic board, and wherein the antenna tuning circuit is configured to tune the display shield to one of a plurality of frequency bands.

2. The multiband antenna of claim 1, wherein the display shield is conductively coupled to an antenna feed conductively coupled to the main logic board.

3. The multiband antenna of claim 2, wherein the antenna shorting pin and the antenna feed are implemented as antenna blades.

4. The multiband antenna of claim 1, wherein the antenna tuning circuit is one of a plurality of tuning circuits electrically connected to the display shield.

5. The multiband antenna of claim 1, wherein the display shield is configured to encloses electrical components of a device, and wherein the display shield is a same size and shape along a first plane as a display.

6. The multiband antenna of claim 1, wherein the display shield extends beyond a display along a first plane.

7. The multiband antenna of claim 1, wherein the display shield defines an aperture extending partially along the surface of the display shield, and
wherein the display shield is grounded by a flexible printed circuit tail passing through the aperture and coupling the display module with at least one other electrical component of a device.

8. An electronic device, comprising:
a display module comprising a display; and
a multiband antenna, comprising:
an enclosure;
an antenna tuning circuit;
a main logic board; and
a display shield, for the display, configured to receive and/or transmit radio frequency waves and separate display components for the display module from other electrical components of the electronic device,
wherein the display shield is further configured to be grounded to the enclosure at least partially by one or more grounding clips,
wherein the display shield
is conductively coupled to an antenna shorting pin that is coupled to the antenna tuning circuit on the main logic board for the electronic device, and
wherein the antenna tuning circuit is configured to tune the display shield to one of a plurality of frequency bands.

9. The electronic device of claim 8, wherein the display shield is conductively coupled to an antenna feed electrically coupled to the main logic board.

10. The electronic device of claim 9, wherein the antenna shorting pin and the antenna feed are implemented as antenna blades.

11. The electronic device of claim 8, wherein the antenna tuning circuit is one of a plurality of tuning circuits conductively coupled to the display shield.

12. The electronic device of claim 8, wherein the display shield is configured to enclose electrical components of the electronic device, and wherein the display shield is a same size and shape as the display along a first plane.

13. The electronic device of claim 12, wherein the display module is enclosed between a cover and the display shield, and wherein the display module comprises a display panel laminated to the cover.

14. The electronic device of claim 8, wherein the display shield extends beyond the display along a first plane.

15. The electronic device of claim 8, wherein the display shield defines an aperture extended partially along the surface of the display shield, and wherein the display shield is grounded by a flexible printed circuit tail coupling the display module with at least one other electrical component of the electronic device.

16. The electronic device of claim 8, wherein the components for the display module comprise a near-field communication (NFC) module configured for processing radio frequency waves.

17. The electronic device of claim 8, wherein the electronic device is a wearable electronic device intended to be worn by a user, and wherein the display shield is physically and electrically isolated from the body of the user when worn by the user.

18. The electronic device of claim 8, wherein the display is a liquid crystal display, a light-emitting diode display, an organic light-emitting diode display, a plastic organic light-emitting diode display, or an electronic ink display.

* * * * *